(12) United States Patent
Berendsen et al.

(10) Patent No.: US 10,746,336 B2
(45) Date of Patent: Aug. 18, 2020

(54) HOSE CONNECTOR SYSTEM FOR AN AGRICULTURAL SPREADER MACHINE

(71) Applicant: Lemken GMBH & Co. KG, Alpen (DE)

(72) Inventors: Mark Berendsen, Lengel (NL); Dennis Bergerfurth, Rees (DE); Martin Gebbeken, Alpen (DE); Marcel Geraats, Nettetal (DE); Christian Gotzen, Viersen (DE); Thomas Lukas, Ahaus-Wullen (DE); Christian Paessens, Issum (DE); Dieter Werries, Alpen (DE)

(73) Assignee: Lemken GMBH & Co KG (DE)

( * ) Notice: Subject to any disclaimer, the term of this patent is extended or adjusted under 35 U.S.C. 154(b) by 255 days.

(21) Appl. No.: 15/120,521

(22) PCT Filed: Feb. 20, 2015

(86) PCT No.: PCT/DE2015/100069
§ 371 (c)(1),
(2) Date: Aug. 21, 2016

(87) PCT Pub. No.: WO2015/124148
PCT Pub. Date: Aug. 27, 2015

(65) Prior Publication Data
US 2017/0016564 A1     Jan. 19, 2017

(30) Foreign Application Priority Data

Feb. 21, 2014   (DE) .................... 10 2014 102 247

(51) Int. Cl.
*F16L 33/22*      (2006.01)
*F16L 37/138*     (2006.01)
(Continued)

(52) U.S. Cl.
CPC ............ *F16L 37/138* (2013.01); *A01C 7/082* (2013.01); *F16L 33/225* (2013.01); *F16L 33/32* (2013.01);
(Continued)

(58) Field of Classification Search
CPC ..... F16L 33/18; F16L 33/207; F16L 33/2071; F16L 33/2073; F16L 33/24; F16L 33/23; F16L 37/14
(Continued)

(56) References Cited

U.S. PATENT DOCUMENTS 1,863,360 A * 6/1932 Weatherhead, Jr. .... F16L 33/18
                                                         285/148.13
1,901,088 A * 3/1933 Burns ................... F16L 33/207
                                                           285/252

(Continued)

FOREIGN PATENT DOCUMENTS

CN        87106907 A     4/1988
CN        2103078 U      5/1991
(Continued)

*Primary Examiner* — Aaron M Dunwoody
(74) *Attorney, Agent, or Firm* — The Watson IP Group, PLC; Jovan N. Jovanovic

(57) ABSTRACT

The invention relates to a hose connector system (1) for use in an agricultural spreader machine (15), which system is characterized by rapid and secure assembly, and therefore economical production and high modularity.

9 Claims, 6 Drawing Sheets

(51) Int. Cl.
  *A01C 7/08* (2006.01)
  *F16L 33/32* (2006.01)
  *F16L 37/14* (2006.01)
  *A01C 7/20* (2006.01)

(52) U.S. Cl.
  CPC .............. *A01C 7/084* (2013.01); *A01C 7/206* (2013.01); *F16L 37/144* (2013.01)

(58) Field of Classification Search
  USPC ................................................. 285/321, 238
  See application file for complete search history.

(56) References Cited

U.S. PATENT DOCUMENTS

| | | | | |
|---|---|---|---|---|
| 1,929,750 | A * | 10/1933 | Loughead | F16L 33/24 285/251 |
| 2,294,960 | A * | 9/1942 | Carlson | F16L 33/24 285/251 |
| 2,319,567 | A * | 5/1943 | Vegell | F16L 35/005 141/1 |
| 2,321,260 | A * | 6/1943 | Stecher | F16L 33/006 285/249 |
| 2,890,900 | A * | 6/1959 | Williamson, Jr. | F16L 33/22 285/238 |
| 2,908,512 | A * | 10/1959 | Morrow | F16L 33/207 285/12 |
| 4,705,304 | A * | 11/1987 | Matsuda | F16L 25/0036 285/243 |
| 4,714,279 | A * | 12/1987 | Custeau | F16L 37/04 285/238 |
| 5,286,068 | A * | 2/1994 | Wiebe | F16L 33/24 285/114 |
| 5,655,796 | A * | 8/1997 | Bartholomew | F16L 37/008 285/214 |
| 7,108,294 | B1 * | 9/2006 | Miller | F16L 25/0036 285/286.1 |
| 9,500,308 | B2 * | 11/2016 | Choi | F16L 33/224 |
| 2008/0231041 | A1 | 9/2008 | Bucchi | |
| 2011/0084480 | A1 * | 4/2011 | Colbachini Aldinio | F16L 25/0036 285/222.1 |
| 2011/0272939 | A1 | 11/2011 | Stettner et al. | |
| 2014/0053939 | A1 * | 2/2014 | Kaye | A61M 39/12 138/109 |
| 2015/0276103 | A1 * | 10/2015 | Manning | F16L 21/002 285/351 |
| 2015/0345674 | A1 * | 12/2015 | Coulson | F16L 33/24 285/417 |
| 2016/0003390 | A1 * | 1/2016 | Harnetiaux | A01C 7/082 285/305 |
| 2018/0266600 | A1 * | 9/2018 | Stankowski | A61M 39/12 |

FOREIGN PATENT DOCUMENTS

| | | |
|---|---|---|
| CN | 1290330 A | 4/2001 |
| CN | 2442075 Y | 8/2001 |
| DE | 197 17 212 A1 | 10/1998 |
| DE | 20201874 U1 | 4/2002 |
| DE | 20201874 U1 | 5/2002 |
| DE | 10205466 A1 | 8/2002 |
| DE | 102007047689 A1 | 4/2009 |
| EP | 0873675 A1 | 10/1998 |
| EP | 873675 B2 | 2/2006 |
| RU | 2395031 C2 | 7/2010 |

* cited by examiner

HOSE CONNECTOR SYSTEM FOR AN AGRICULTURAL SPREADER MACHINE

BACKGROUND OF THE DISCLOSURE

European patent EP 873 675 B2 shows an agricultural spreader machine in the form of a pneumatic seed drill. Seed from a storage container is dosed in a blower air flow and passes through a pipe system into one or more distributor heads. There, the seed air flow is divided into individual flexible hose lines, which lead to the distributor devices in the form of seed coulters. Fastening the hose lines with hose clamps onto the respective terminals is generally known. However, because the seed coulters move up and down very quickly when in operation, the hose lines start to vibrate. Premature fractures of the hose lines occur here directly behind the hose clamp, where the hose lines are constricted. In addition, assembly of the hose clamps is inconvenient and time consuming. Pins that in another familiar solution are knocked into both sides of the end of the hose lines, secure the hose against being pulled off and reduce the assembly time, but also weaken the hose material at the impact point. Moulded hose ends are familiar that strengthen the hose line ends partially. However, hose lines equipped in this way are only available pre-assembled and not by the metre and in the event of repairs cannot always be obtained at short notice. In the German application documents DE10 205 466 A1 a hose coupling adapter is proposed in which an elastic, dimensionally stable hose end is pushed into the cylindrical opening of a coupling sleeve and screwed or glued to its inner surface. This method of securing hoses is time-consuming to make and, in case of gluing, the hose is no longer detachable. In German patent application DE 10 2007 047 689 A1 a hose fastener on a distributor head is described whereby several spiral hoses are clamped between two mould halves of a distributor head. Because the hoses are very cumbersome to handle, several persons are required for the assembly to insert the hoses and at the same to fit the mould halves. Assembly by one person would be possible with a mounting device, but this would be time-consuming to equip and fix in place. If the distributor head is provided with inner sleeves to hold the hoses in order to guarantee an undisturbed particle flow into the hose, this proposed fastener is eliminated. German utility model DE 202 01 874 U1 shows an elastic insert for fastening corrugated metal hose that is pressed into the corrugations of the corrugated metal hose by pressing with a pressing device and seals and secures the hose against a counterpart.

SUMMARY OF THE DISCLOSURE

For this reason, the invention is faced with the task of creating a connector system for hose lines for agricultural spreaders that is assembled quickly and securely, and which does not come off or become loose independently even with high vibration loads, but at the same time can be assembled easily and at low cost in spite of this.

This task is solved through the features in the characterising part of claim 1.

When an outer sleeve whose inside diameter is partially narrowed by elevations is slid or pressed onto the end of an elastic hose line, the elevations are pressed into the partially elastic material of the hose line. In this way, a virtually positive-locking and tension-resistant connection is achieved between hose line and outer sleeve. The outer sleeve itself can now be inserted into the opening with a defined tolerance and secured there against movement. Simple and accurate assembly is given through the pre-assembly of the outer sleeve and the hose line before actual laying in the spreader.

A particularly easy to assemble implementation of the invention is given if the wall of the hose line, preferably the outer wall, is formed with spiral elements. This enables the outer sleeve to be screwed onto the hose lines with minimum effort.

In a further improved embodiment of the invention one or more elevations on the inner surface of the outer sleeve are also spiral shaped, whereby the direction of rotation coincides with that of the spiral elements of the hose lines. Through this, the effort required to turn the outer sleeve onto the hose line is reduced further on the one hand, and, on the other hand, the tensile strength of the connection between outer sleeve and hose line is improved further.

In a particularly suitable embodiment of the invention the outer sleeve has one or more at least partial recesses or slots mainly in an axial direction. Through these recesses or slots the diameter of the outer sleeve is widened when it is slid, mounted or screwed onto the hose and facilitates this. When the outer sleeve is then inserted into the opening with a defined diameter the outer sleeve clamps the hose line even better with the inner elevations and secures the hose line against being pulled out.

In a further form of the invention the opening and the outer sleeve are designed to be lockable against rotational movement towards each other. An unintended loosening of the connection is prevented in a simple way in particular with a spiral design of the hose line and/or of the elevations of the outer sleeve. Tongue-and-grove combinations are suitable for this purpose, for example, as well as contours deviating from the cylinder form, for example, square or hexagonal contours, with which the aligned surfaces of the opening and outer sleeve are designed corresponding to each other.

In another form of the invention the outer sleeve is divided in several sections. Because of this, the sections of the outer sleeve can be placed onto the hose line practically without effort. Subsequent insertion of the outer sleeve or its sections into the opening with a defined diameter presses the elevations of the outer sleeve into the hose line and forms the virtually positive-locking, tension-resistant connection between hose line and outer sleeve.

In a further form of the invention the sections of the outer sleeve are designed hinged together. Because of the hinged form of the outer sleeve it only needs to be compressed at one point and inserted into the opening. The use of a film hinge in particular, which is known from injection moulding, enables the low-cost production of a one-piece outer sleeve "in one round" and in spite of this the flexibility of the sleeve sections to each other.

An easy to assemble form of the invention is given if one or more sections of the outer sleeve are designed to be fixable with each other positively lockable by means of snap-in elements 32. Through forming one or more elastic fixing elements or hooks and corresponding recesses on the outer sleeve or its sections, the outer sleeve can be "clicked" onto the hose in a very easy to assemble manner and securely.

In a further embodiment of the invention an additional coupling adapter 31 for holding a measuring or control device is located for fastening in an outlet or inlet that is designed with openings at its own outlet or inlet openings for holding an outer sleeve and a hose in accordance with the above claims. This construction type enables simple and modular assembly for example of a sensor head for measuring or assessing the particle flow at the distributor head or at the spreading device. Similarly, modular integration of stop or directional valves is possible. At the same time, a combination of these devices with a dosing computer for monitoring and controlling the distribution process is also conceivable. The adapter can also be located with an inlet and outlet and associated openings within a hose line, for which purpose the latter is interrupted and divided.

The invention is characterised in particular in that a tension-resistant, non-self-releasing, easy to assemble and low-cost hose connector system for an agricultural spreader machine is provided in a surprisingly simple way.

Further details and advantages of the object of the invention result from the following descriptions and the associated drawings in which an embodiment is shown with the necessary details and individual parts.

DETAILED DESCRIPTION OF THE DISCLOSURE

Figure 1:
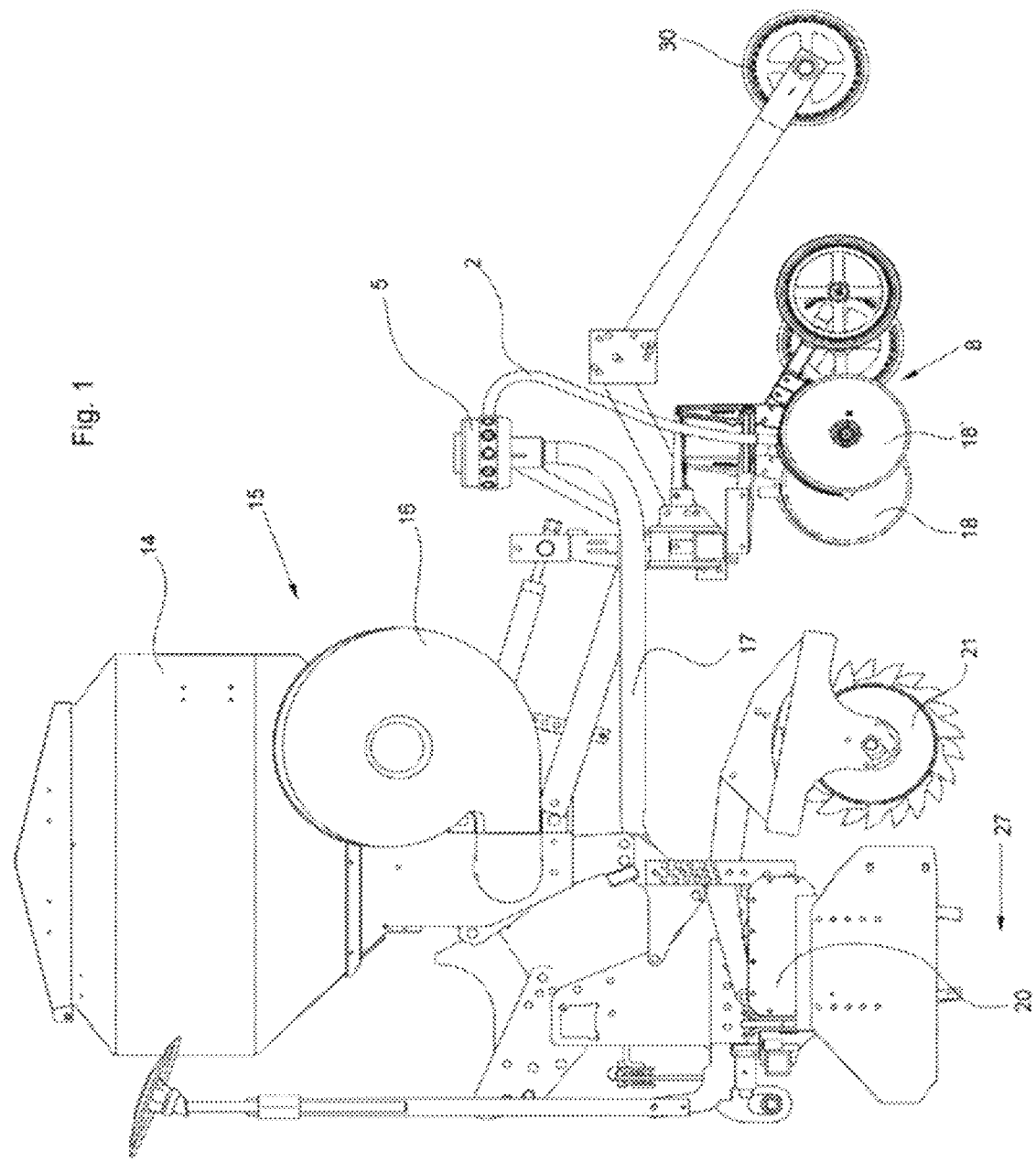
FIG. 1 shows the schematic structure of an agricultural spreader machine in a side view.

FIG. 1 shows an agricultural spreader machine 15, which is mounted here on a rotary harrow 20 with packer roller 21. Combinations of the spreader machine 15 with other soil cultivation devices are just as possible as solo operations on a tractor that is not shown here. The tractor serves at the same time to drive and move the agricultural spreader machine 15. The agricultural spreader machine 15 5 can be equipped with a chassis. Fertiliser or seed is carried in container 14 and is metered with a metering device that is not shown into the feed line 17 during operations of the spreader machine 15 in dependence on the distance travelled. The distance travelled is transmitted to the metering device via a roller feeler 30 that is connected to the spreader machine 15. A dosing computer can intervene in the setting and the drive of the metering device to regulate. In the process, the blower 16 ensures a flow of air that transports the material into the distributor head 5 and from there into the respective distributor devices 8 through several hose lines 2.

Figure 2:
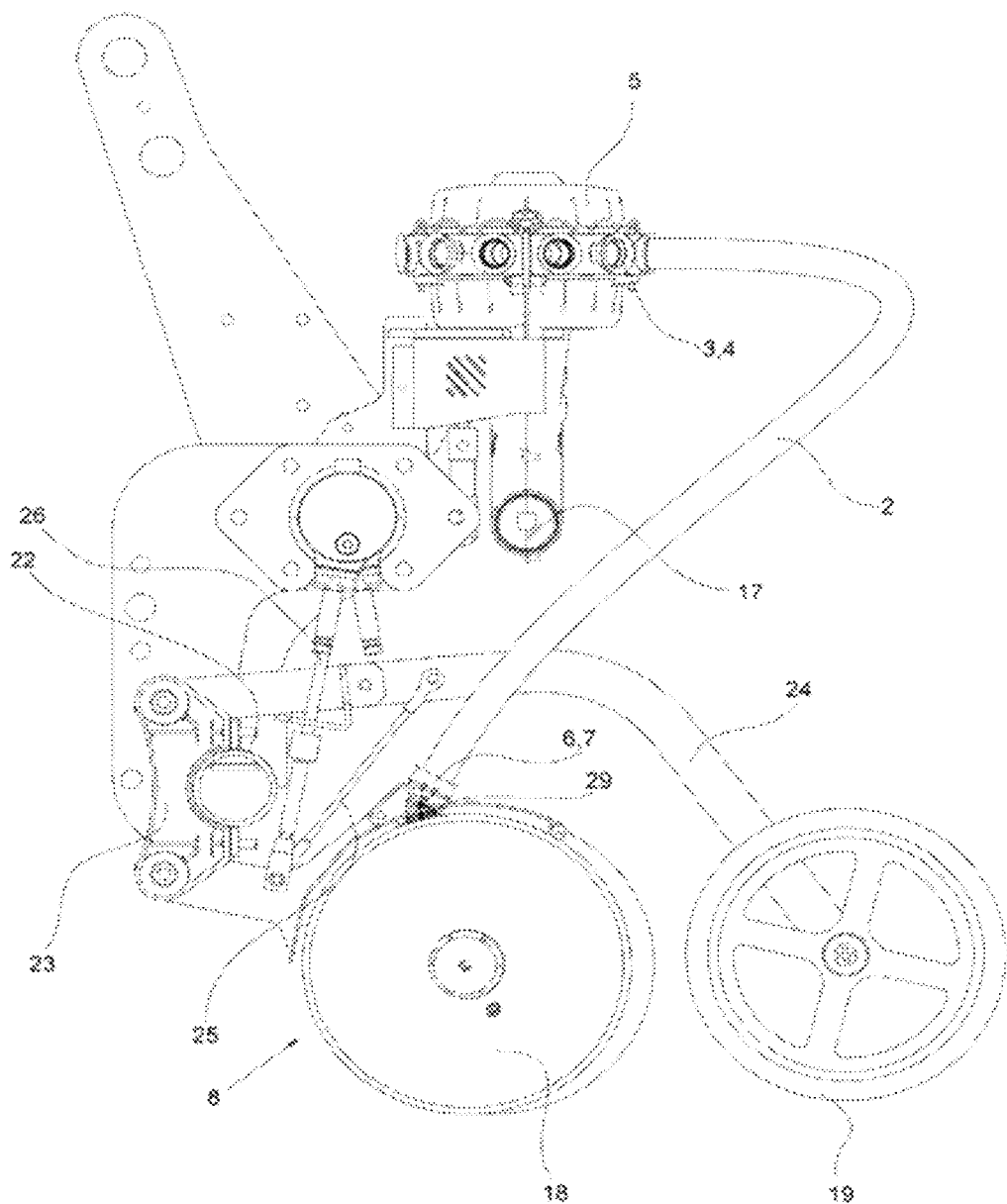
FIG. 2 shows the schematic structure of distributor device in a side view.

FIG. 2 shows a distributor device 8. This is shown in the form of a double disc coulter 18, of which several are arranged on a cross frame 22 laterally spaced next to each other. As can be seen in FIG. 1, an offset of the double disc coulters 18, 18' in the direction of travel 27 is possible. One each of the double disc coulters 18 is connected to the cross frame 22 vertically movable via a bearing element 23. The depth guidance to the ground is provided by the support wheel 19 and the arm 24, which is also connected to the cross frame 22 vertically movable via the bearing element 23. The connection element 25 in the form of a traction cable guides the double disc coulter 18 and the arm 24 with support wheel 19 practically parallel in the height to the ground. A pressure force can be exercised on the double disc coulter 18 through the press-in element 26, which causes the double disc coulter to penetrate the surface of the soil with its inclined rotating discs and forms a furrow for depositing the seed or the fertiliser.

As already described in FIG. 1, FIG. 2 shows an air-material mix is blown vertically upwards through the feed line 17 into the distributor head 5. The air-material flow is distributed evenly over all outlets 4 as a particle flow via a cone that is not shown and transported via the hose line 2 into the respective distributor devices 8. When this is done, individual outlets 4 can be blocked, for example, to form tramlines or for part-width section control.

Figure 3:
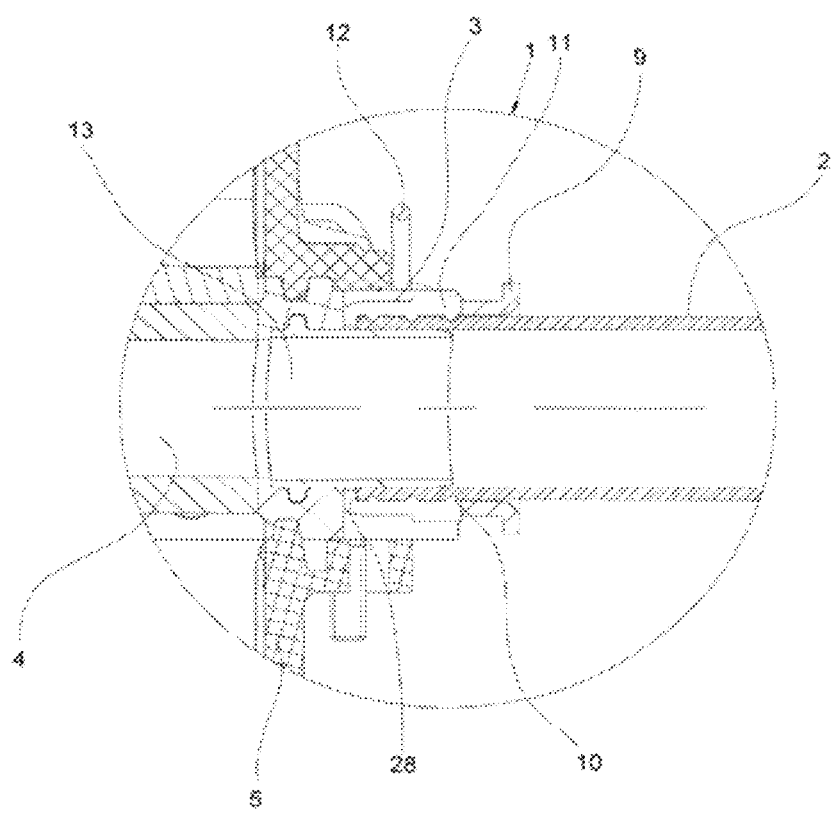
FIG. 3 shows a cross-section through a distributor head with outlets.

FIG. 3 shows the actual hose connector system 1 in a cross-section through a part of the distributor head 5. The particle flow is blown out of the distributor head 5 through the outlet 4 into the hose line 2. To prevent the particle flow from being disturbed or braked through the end of the hose line 2, a sleeve 13 is inserted into outlet 4 that projects into the hose line 2 and in this way enables a collision-free particle flow. This sleeve 13 can also be a component of the distributor head 5. The outer sleeve 9 is slipped over or screwed onto the hose line 2, whereby a front stop edge 28 guarantees complete and fault-free sliding of the outer sleeve 9 onto the hose line 2. The outer sleeve 9 is circumferentially rounded in the rear section of the interior diameter surface to prevent premature wear and fracture of the hose lines 2. A trumpet-shaped attachment or elastic extension elements that stabilise the hose are also conceivable. In the front section of the hatched visible outer sleeve 9 the slot section 11 as a recess in the lengthwise direction of the outer sleeve 9 is detectable without hatching. This is widened slightly when the outer sleeve 9 is slid onto the hose line 2 and makes sliding on easier. When the outer sleeve 9 with the fitted hose line 2 is inserted into the opening 3, this can be pushed against the inside edge of opening 3 or of distributor head 5 precisely up to the sealing butt joint of the front edge 28 of the outer sleeve 9. The outer sleeve 9 is axially secured and fixed with a corresponding, circumferential groove or tangent slots through the locking mechanism 12 in the form of a wire bow or with pins, which touch or penetrate the cylinder surface of opening 3 preferably vertically through suitable holes in the distributor head housing 5. Other securing systems are also conceivable, for example automatically hooking clips. Through suitably selected diameter tolerances for the outer sleeve 9 and opening 3 the outer sleeve 9 is pressed together over its whole length to a defined inside diameter. The elevations 10 attached to the inside diameter surface of the outer sleeve 9 are pressed firmly into the hose line 2 and make the virtually positive-locking connection between hose line and outer sleeve 9. In the slot area 11 of the outer sleeve 9 there is also a convex shaped spring that, with a matching groove in the surface of opening 3, prevents axial twisting of the components towards each other.

Figure 4:
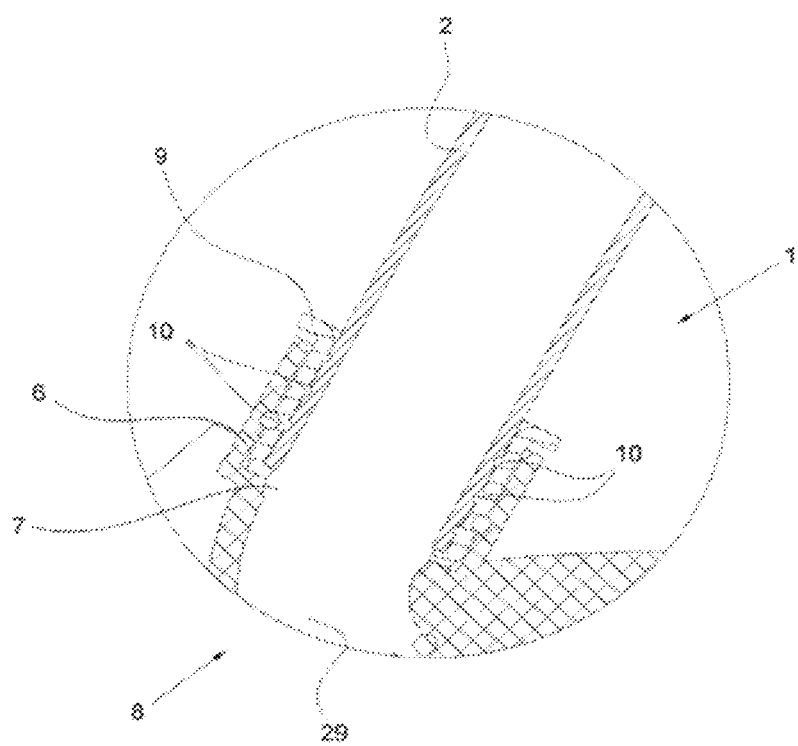
FIG. 4 shows a cross-section through an element of the distributor device.
Figure 5:
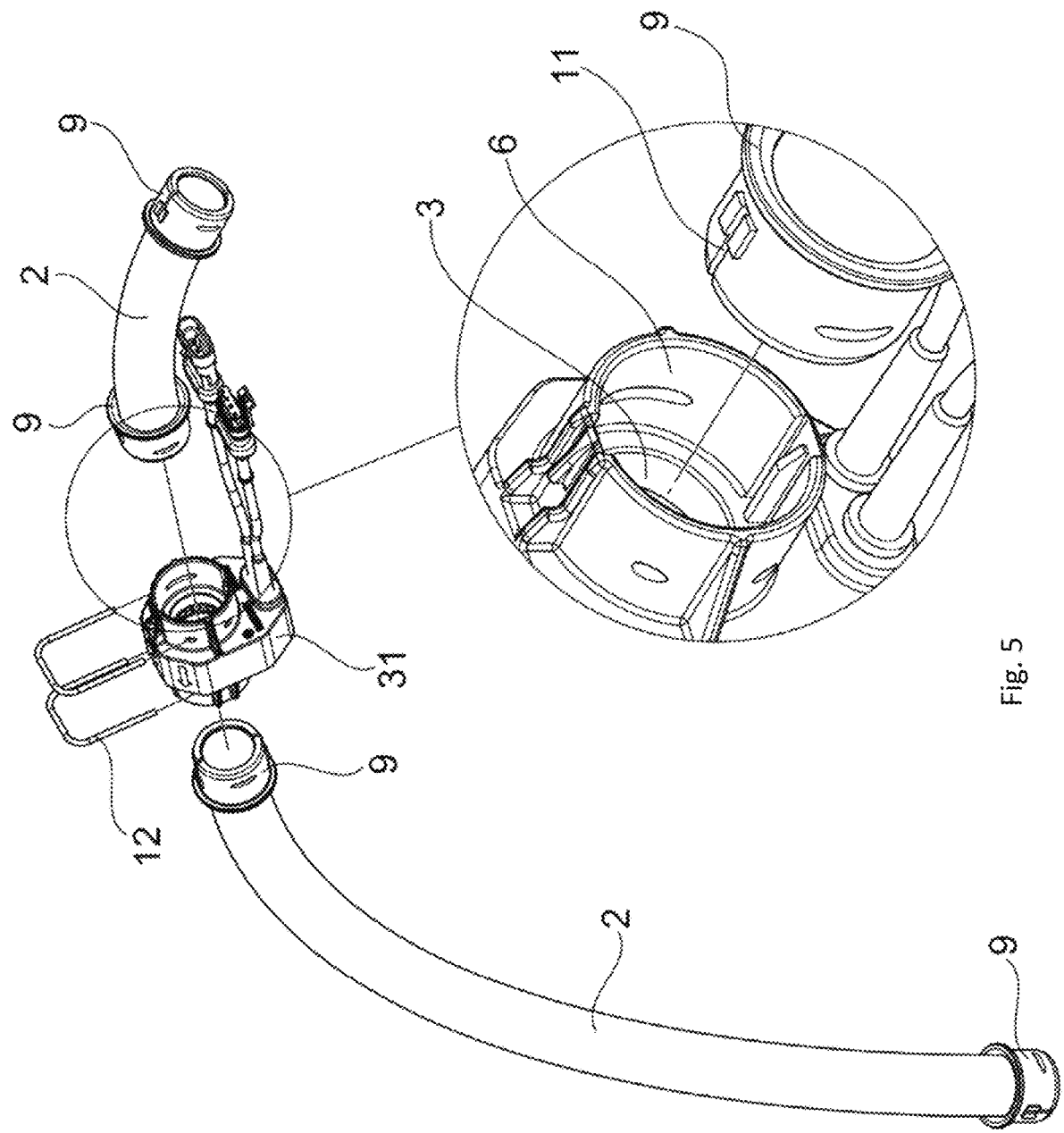
FIG. 5 shows an additional coupling adapter.
Figure 6:
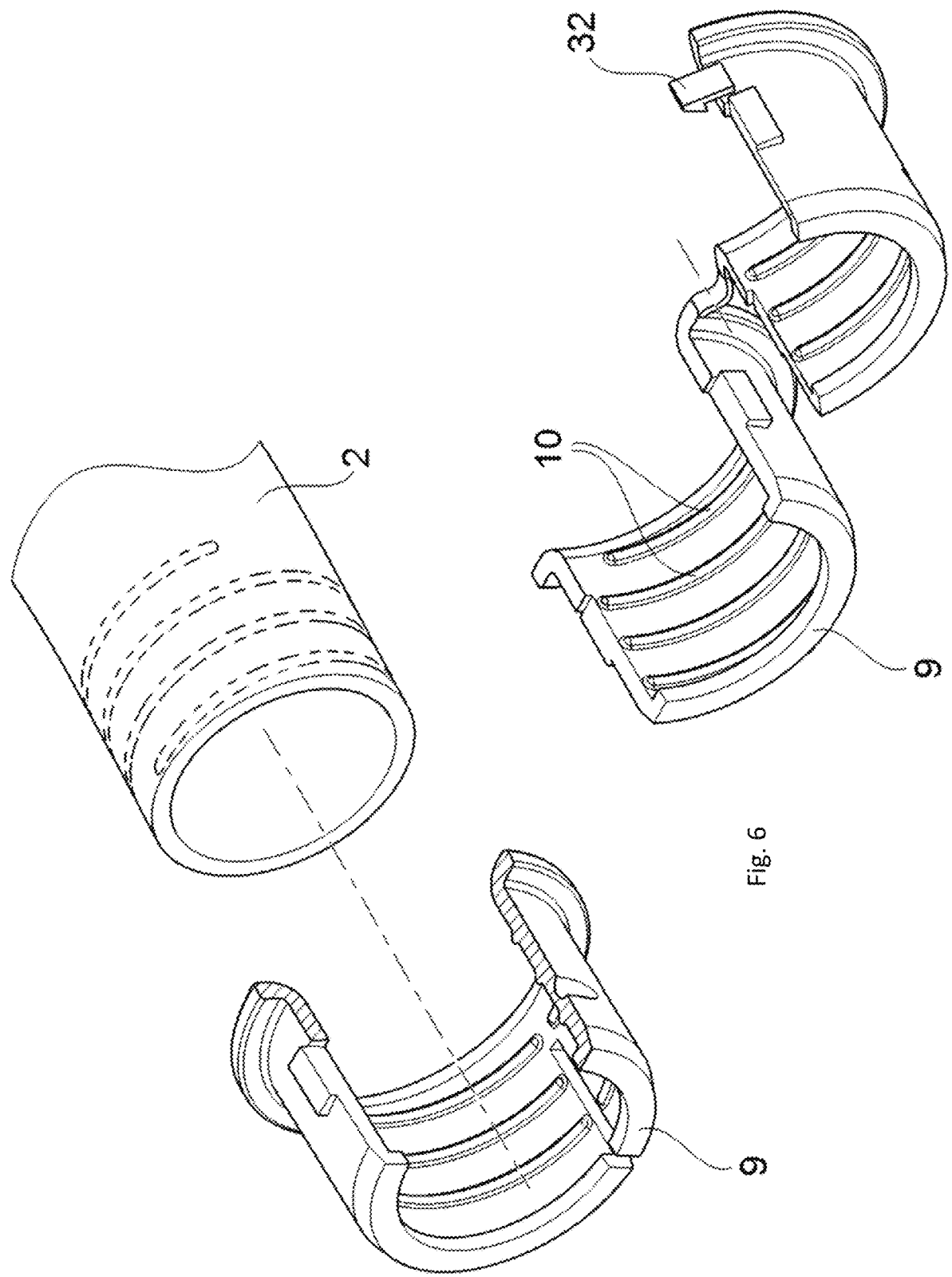
FIG. 6 shows snap-in elements.

FIG. 4 shows a partial cross-section through the inlet 7 of the distributor device 8, here a channel element 29, which guides the fertiliser or the seed as a particle flow from the hose line 2 through the inlet 7 and the double disc coulter 18 to near the furrow in the soil formed by the double disc coulter 18. Analogously to the description of FIG. 3, the outer sleeve 9 is pushed onto hose line 2 up to the stop edge and the unit consisting of outer sleeve 9 and hose line 2 is pushed into the opening 6 of inlet 7. An inner sleeve can be done without here, care must only be taken that inside contour of channel 29 that connects with the opening 6 is greater than the inside width of hose line 2, in order to guarantee perfect particle flow without disruptive edges.

The invention claimed is:

1. A hose connector system for an agricultural spreader machine for spreading granulated or ground material, comprising:
a dimensionally stable hose line to transport the material therethrough via air flow, whereby one end of the hose line is inserted into an opening at an outlet and the other end of the hose line is inserted into another opening at an inlet, the opening at the outlet being a distributor head of the agriculture spreader machine and the another opening at the inlet being a distributor device of the agriculture spreader machine, whereby one end of the hose line includes an outer sleeve which is placed detachably onto the end of the hose line and projects at least partially into one of the openings at the inlet and the outlet,
wherein an inside surface of the outer sleeve has one or more elevations that form an inside diameter of the outer sleeve and the inside diameter of the outer sleeve is less than a nominal diameter of an outer surface of the hose line in an inserted state, whereby the outer sleeve, whose internal diameter is partially constricted by the one or more elevations, presses with the one or more elevations into a partially elastic material of the hose line, and the outer sleeve has at least one partial recess or slot in an axial direction, and
wherein the openings and the outer sleeve are lockable towards one another via the one or more elevations, the openings and the outer sleeve also including contours that deviate from the cylinder form with which aligned surfaces of the openings and the outer sleeve correspond to each other, the contours preventing rotatory movability therebetween.

2. The hose connector system in accordance with claim 1, wherein a wall of the hose line is designed with spiral elements.

3. The hose connector system in accordance with claim 2, the one or more elevations of the inside surface of the outer sleeve are also designed with a spiral shape, whereby a direction of rotation of the one or more elevations corresponds to that of the spiral elements of the hose line.

4. The hose connector system in accordance with claim 1, the outer sleeve is divided into in several sections.

5. The hose connector system in accordance with claim 4, the sections of the outer sleeve are designed hinged towards each other.

6. The hose connector system in accordance with claim 1, one or more sections of the outer sleeve are designed to be fixable with each other positively by means of snap-in elements.

7. The hose connector system in accordance with claim 1, further comprising a coupling adapter to hold a measuring or control device for fastening in the outlet or inlet, which has openings at outlet or inlet openings, respectively, for holding the outer sleeve and the hose.

8. An agricultural spreader machine including at least one of the hose connector system in accordance with claim 1.

9. A connection for a hose connector system for an agricultural spreader machine for spreading granulated or ground material such as fertiliser or seeds, comprising:
dimensionally stable hose lines to transport the material therethrough via air flow, whereby one end of the hose line is inserted into an opening at an outlet and the other end of the hose line is inserted into another opening at an inlet, the opening at the outlet being a distributor head of the agriculture spreader machine and the another opening at the inlet being a distributor device of the agriculture spreader machine, whereby one end of the hose line includes an outer sleeve which is placed detachably onto the end of the hose line and projects at least partially into one of the openings at the inlet and the outlet,
wherein the inside surface of the outer sleeve has one or more elevations that form the clear inside diameter of the outer sleeve and the clear inside diameter of the outer sleeve is less than the nominal diameter of the outer surface of the hose line in the inserted state, whereby the outer sleeve, whose internal diameter is partially constricted by elevations, presses with its elevations into the partially elastic material of the hose line, and the outer sleeve has one or more partial recesses or slots in an axial direction, and
wherein the openings and the outer sleeve are lockable towards one another via the one or more elevations, the openings and the outer sleeve also including contours that deviate from the cylinder form with which aligned surfaces of the openings and the outer sleeve correspond to each other, the contours preventing rotatory movability therebetween.

* * * * *